Sept. 28, 1965    S. BERNSTEIN    3,208,692
TUG-TOW ARRANGEMENT FOR NUCLEAR AIRCRAFT
Filed Oct. 12, 1949
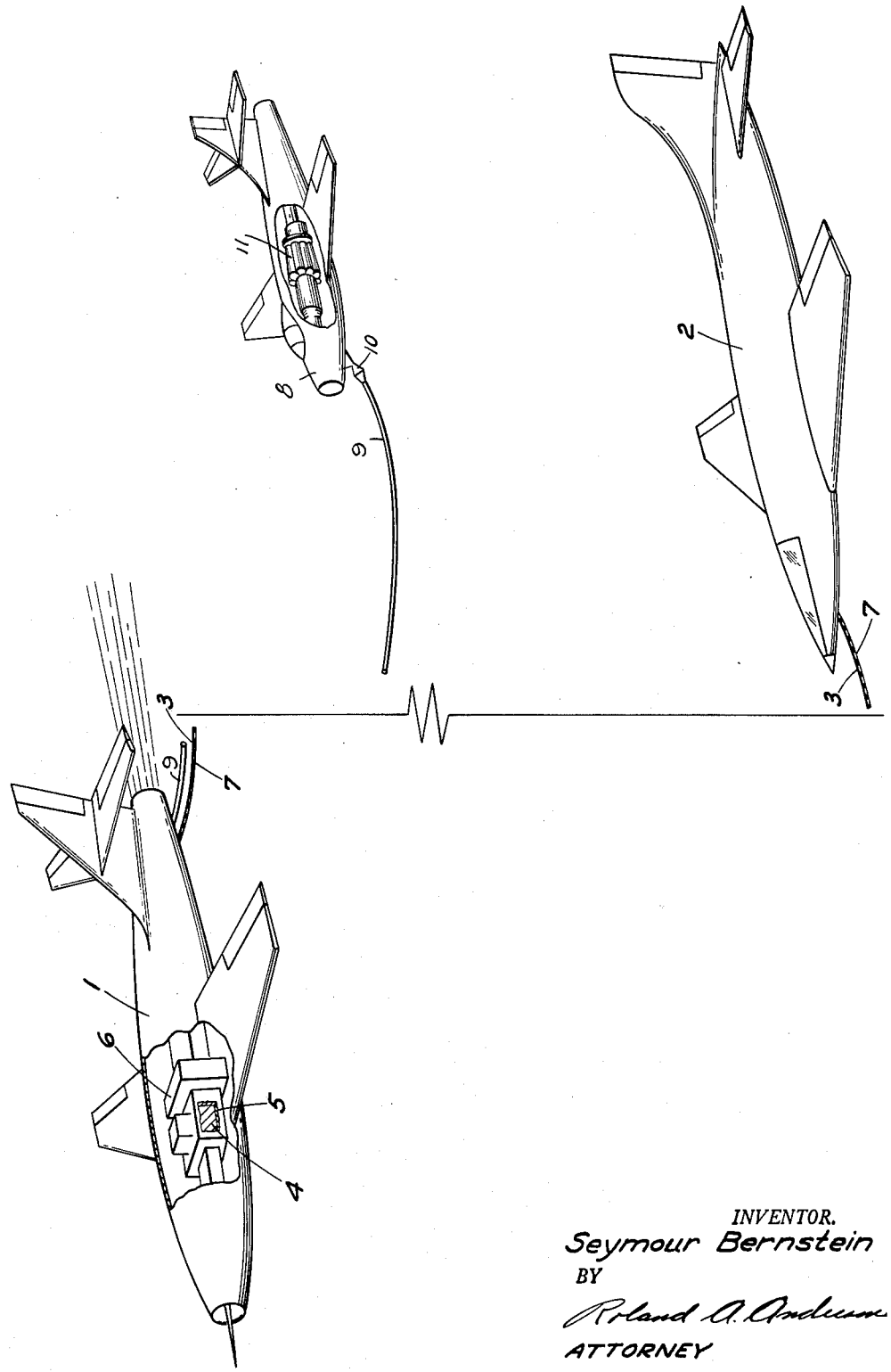
INVENTOR.
Seymour Bernstein
BY
ATTORNEY

United States Patent Office 3,208,692
Patented Sept. 28, 1965

3,208,692
TUG-TOW ARRANGEMENT FOR NUCLEAR AIRCRAFT
Seymour Bernstein, Oak Ridge, Tenn., assignor to the United States of America as represented by the United States Atomic Energy Commission
Filed Oct. 12, 1949, Ser. No. 120,897
5 Claims. (Cl. 244—3)

The present invention relates in general to aircraft, and more particularly to an improved aircraft combination propelled by radiation-emitting power source.

As is known, the areonautical art is ever striving to increase both the range and speed of aircraft. However, with aircraft propelled by energy derived from chemical reaction, as is currently conventional, range is limited by the maximum permissible fuel capacity of the craft. Furthermore, since the amount of fuel consumed per unit distance increases, in general, with increase in speed, the actual range obtainable with maximum fuel capacity becomes smaller as higher speeds are employed. There are thus definite general limitations to the extent to which both range and speed may be increased in aircraft propelled by conventional chemical fuel.

The application to aircraft propulsion of the enormous specific energy content liberatble by nuclear fission has become recognized as being of great promise for extending these characteristics far beyond the limitations thereto inherently imposed in the use of chemical reaction for the energy source. The quantitiy of thermal energy produced per unit of fuel by nuclear fission vastly surpasses that producible by chemical reaction. Thus since at maximum fuel capacity more latent propulsive energy may be carried in the form of nuclear fuel than as chemical fuel, use thereof affords considerable increases in both range and speed over those obtainable with chemical propulsion. Propitiously, nuclear fission may be readily conducted in a quite limited space, and hence provides an uncommonly compact source of thermal energy eminently suited for improved aircraft propulsion.

For example, in neutron induced fission of the 235 isotope of uranium, the amount of thermal energy produced per pound of fuel consumed is of the order of 2,000,000 times that produced by aviation gasoline. Clearly, the use of fuel of such enormous specific energy content renders insignificant the maximum fuel capacity consideration which was formely the controlling factor limiting range; a very small amount of such fuel is sufficient for effective elimination of range limitations to earth-bound aircraft. Furthermore, the fission reaction is advantageously inherently capable of controllably producing that energy at any desired rate; thus the reaction can provide sufficient power for virtually any aircraft speed that other design considerations will permit.

The fission reaction may in theory be adapted to aircraft propulsion by substituting nuclear fission reactor for the chemical combustion chamber in aircraft jet propulsion means, such as ram-jet, turbo-jet, and turbo-propeller-jet types of engines. Generally speaking, a satisfactory reactor for the purpose comprises a square cylindrical container, about 8 to 10 cubic feet in volume, having disposed therein a supercritical mass of $U^{235}$ comprising a few pounds thereof dispersed in a matrix of a moderator for slowing neutrons, and provided with a multiplicity of parallel ducts for passing air in heat exchange relationship therethrough. A self-sustaining chain fission reaction will spontaneously transpire in the reactor, with the rate of heat production being controlled by the adjustable insertion of rods of strong neutron absorber into the reacting system. Atmospheric air, incoming through a diffuser and then compressed if required by the engine type, is passed through the heat exchange ducts of the reactor, whence it is heated and expands, and then is jetted rearward to the atmosphere to propel the craft in the usual manner, first driving a turbine if required by the engine type. Alternatively to passing the air directly through the nuclear reactor, an intermediate heat transfer medium may be employed to extract heat from the reactor and deliver it to the air flowing through the jet engine.

Fissionable materials other than $U^{235}$ have liberatable specific energy contents of similar magnitude, and may alternatively be used as the fuel.

It should be stated here that the above-discussed applications of nuclear fission to power production and aircraft propulsion are the inventions and concepts of others and do not, per se, form a part of the present invention. For additional informitaon concerning applicable methods and apparatus, reference is made to "Science and Engineering of Nuclear Power," edited by Clark Goodman, Addison-Wesley Press, Inc., Cambridge, Massachusetts, 1947, and to co-pending application Serial No. 115,829(48), filed September 15, 1949, for Power Plant for Jet Aircraft, in the name of Ascher H. Shapiro.

While the use of nuclear fission would provide a marked advance in aircraft propulsion, there is one serious obstacle that has prevented its application to aircraft. That is, the suitable nuclear reactions characteristically and necessarily are accompanied by the emission of intense biologically and technically harmful radiation. In order to reduce the emanated radiation in an aircraft to a level tolerable to its crew, instruments, and often its cargo, upon substitution of a nuclear reactor for conventional source of propulsive energy in aircraft of usual design, it is necessary to envelope the reactor in a sufficient thickness of massive, dense, radiation shielding. For example, in so employing neutronic $U^{235}$ fission reactor, operating at a power level suitable for normal aircraft propulsion. Shielding of the order of a 5 to 8 foot thickness of structural concrete, conventional for the purpose, would be required. Thus, while the reactor itself would have a volume of about 10 to 15 cubic feet, a total weight of less than a ton, and a across sectional area transverse to the longitudinal axis of the fuselage of about 5 square feet, the described shield would have a volume of the order of 1500 to 5000 cubic feet, a weight of the order of 2 to 7 hundred thousand pounds, and a cross sectional area ranging from 100 to 300 square feet. Consequently, such a shielded power unit could be so used in only extremely large airplanes, at least, estimatedly, of the 4 to 5 hundred thousand pound class. However, the practical feasibility of airplanes of such great size is no more than barely marginal from both commercial and military standpoints. It has therefore become highly desirable that means be provided for applying nuclear reaction to the propulsion of smaller, and thus more practically feasible aircraft.

One object of the present invention is to provide aircraft containing a radiation-emitting source of propulsive energy wherein the emitted radiation is reduced to a tolerable level with less radiation shielding than has heretofore been required in the aircraft application of such propulsive means.

Another object is to provide, in such manner, aircraft, propelled by energy derived from a contained radiation-emitting source, of size and weight considerably smaller than those heretofore designed in the aircraft application of such propulsive means.

A further object is to provide a means for employing for aircraft propulsion radiation-emitting propulsive engines much smaller and lighter than those heretofore required in the aircraft application of such propulsive means.

Still another object is to provide improved aircraft capable of longer flying ranges than currently conventional aircraft.

Still a further object is to provide such improved aircraft adapted to operation at higher speeds than currently conventional aircraft.

Other objects will become apparent hereinafter.

In accordance with the present invention, an improved operationally-integrated combination of aircraft comprises a tug airplane powered by a radiation-emitting power source, a two aircraft adapted to carry a crew, coupling means between said tug airplane and said tow airplane to permit unpowered flight of said tow aircraft when in towed relationship to said tug airplane, and control means operable from said tow aircraft adapted to control powered flight of said tug airplane. In this manner, the more radiation-sensitive entities such as crew, delicate instruments, and, if necessary, cargo, are located in the towed aircraft spaced a considerable distance behind the radiation-emitting tug. With this arrangement, the reactor-enveloping shielding required to reduce radiation to a level tolerable to the radiation sensitive entities in the towed craft is considerably reduced. Since nuclear reactor propulsion units of consequently much smaller total size and weight may therefore be employed in the tug airplane, the necessary size of the tug airplane is accordingly reduced. As smaller airplanes are better adapted to higher speeds, the decreased size of the tug airplane advantageously simplifies the adaptation of the combined craft to trans- and super-sonic speeds. Therefore by reducing the weight and volume of massive shielding required for radiation protection, the aircraft arrangement of this invention makes available to smaller, more practically sized aircraft, the advantageous attributes of nuclear propulsion, including long-range and high-speed.

The present arrangement is adapted to the use of a nuclear fission reactor as a heat source. Jet engines are the preferred means for converting the produced thermal energy to kinetic propulsive energy because of their superior high-speed characteristics, although other suitable heat engines may also be employed. Means such as metal wire cable and nylon rope have been found to be satisfactory for coupling together the tug and tow craft. Preferably, the coupling should be sufficiently elastic to afford shock absorption during towing. Therefore, it is often advantageous to supplement the elastictiy of the towing line itself by providing it with a pneumatic or hydraulic shock absorption system.

The reduction of the amount of bulk shielding required for enveloping the nuclear reactor is accomplished in the aircraft of the present invention by virtue of three principal factors. First, spherical geometry considerations cause the magnitude of radiation, emanating from a concentrated, effectively point source, and traversing a distant unit transverse area, to decrease directly as the square of the distance of that area from the source. Second, the air in the interspace between the tug and the tow craft acts itself as a shielding medium to attenuate radiation, thereby effectively complementing radiation flux attenuation resulting from the spherical geometry considerations. Third, if the radiation flux reaching the tow aircraft would still be above tolerance in spite of the first two factors, bulk radiation shielding in the tug airplane need not completely envelope the reactor but need only be provided at the rear of the reactor, thus producing a radiation "shadow" in the direction of the towed craft.

The appended drawing diagrammatically illustrates an aircraft combination embodying the present invention. Referring to the drawing, a self-propelled tug airplane 1, has connected thereto in towed relationship a tow airplane 2, carrying a crew, flight instruments, and cargo. The towing means connecting the craft comprises a metal wire cable 3. Tug airplane 1 is propelled by a jet engine deriving its energy from a radiation-emitting, self-sustaining, neutron-induced $U^{235}$-fission nuclear reactor 4, which is enveloped in a neutron reflector 5, and provided with radiation shielding 6 over its rear end. Both airplanes are provided with conventional aircraft maneuvering means, including ailerons, rudders, elevators, wing-flaps, and retractable landing gear. Flexibly bonded to wire cable 3 is an electrical cable 7 containing a multiplicity of separate electrical conductors to provide electrical contact between the tug and tow airplanes, thus enabling the jet engine, reactor, and maneuvering means of the tug airplane 1 to be electrically remotely controlled from the tow airplane 2, and also providing for electrical telemetering of flight and power plant information from the tug airplane to the tow airplane. The tow airplane 2, is provided with manual controls for its maneuvering means.

The combined aircraft, in tug-tow relationship, are operated as a unit, with the crew in the tow airplane 2 controlling the flight of both airplanes. Under circumstances where jet engine propulsion of the tug airplane 1 involves passing the flow of propulsive air directly through the nuclear reactor 4, the air becomes somewhat radioactive, and upon effluenece from the jet diffuses into the atmosphere forming a narrowly diverging conical wake of radiactive air. Therefore, the tow airplane should normally be maneuvered, by the means provided, so as to avoid the wake of harmful radioactive air. Such avoidance may be effected conveniently by causing the tow airplane to trail at a level sufficiently above or below that of the tug, for example, below, as shown in the drawing.

Also shown in the drawing is a second tow aircraft 8, optionally included in the arrangement along with tug airplane 1 and tow aircraft 2, connected in towed relationship to tug airplane 1 by means comprising tow cable 9 and conventional means for mid-air uncoupling and recoupling 10. Tow aircraft 8 is provided with an auxiliary self-propulsion means 11, in this case a chemically-fuelled turbo-jet engine, to permit independent, self-propelled flight thereof when in uncoupled relationship with tug airplane 1 permitted by the function of uncoupling and recoupling means 10.

While the tow aircraft may satisfactorily trail as far as or farther than a mile behind the tug airplane, it is preferable for convenience in aerial maneuvering, and take-off and landing operations, that distances of a half mile or less be employed. In most cases, however, convenience is secondary to the radiation problem in determining the exact spacing to be used. To provide a representative quantitative index to the effect of separation distance and altitude on attenuation of the types of harmful radiation primarily encountered in such applications, the following data are presented. In the following Table I, values for the dosages of both fast neutrons (energies over 0.1 mev.) and gamma radiation received at different distances and at varying altitudes from an unshielded self-sustaining fission reactor operating at a 100,000 kw. energy output are tabulated. In this regard, in substantially all applicable nuclear reactions, fast neutrons and gammas are the controlling considerations insofar as shielding is concerned. Other species of harmful radiation are much more readily attenuated than these, so adequate protection against these two is generally more than sufficient for the others.

TABLE I

*Radiation flux dosage at various distances and altitudes from an unshielded operating fission reactor*

Reactor power level: 100,000 kw.
Fission neutrons generated per second: $3 \times 10^{18}$
Volume of reactor: 15 cubic feet (approximately)
[Fast neutron dosage (in Roentgens per hour) [1]]

| Altitude, ft | 0 | 21,000 | 39,000 | 59,000 | Infinite |
|---|---|---|---|---|---|
| Air density | $\rho$ | $0.5\rho$ | $0.25\rho$ | $0.1\rho$ | 0 |
| Distance (meters): | | | | | |
| 10 | $1.5 \times 10^7$ | $1.5 \times 10^7$ | $1.4 \times 10^7$ | $1.4 \times 10^7$ | $1.4 \times 10^7$ |
| 50 | $9.7 \times 10^5$ | $6.9 \times 10^5$ | $6.0 \times 10^5$ | $5.7 \times 10^5$ | $5.6 \times 10^5$ |
| 100 | $3.4 \times 10^5$ | $2.4 \times 10^5$ | $1.7 \times 10^5$ | $1.5 \times 10^5$ | $1.4 \times 10^5$ |
| 200 | $1.0 \times 10^5$ | $8.6 \times 10^4$ | $6.1 \times 10^4$ | $3.9 \times 10^4$ | $3.5 \times 10^4$ |
| 500 | $9.4 \times 10^3$ | $1.6 \times 10^4$ | $1.5 \times 10^4$ | $9.7 \times 10^3$ | $5.6 \times 10^3$ |
| 1000 | $3.9 \times 10^2$ | $2.4 \times 10^3$ | $4.0 \times 10^3$ | $3.4 \times 10^3$ | $1.4 \times 10^3$ |
| 2000 | 1.3 | $9.7 \times 10$ | $5.9 \times 10^2$ | $1.0 \times 10^3$ | $3.5 \times 10^2$ |
| 5000 | | $2.1 \times 10^{-2}$ | 5.5 | $9.4 \times 10$ | $5.6 \times 10$ |
| 10,000 | | | $5.4 \times 10^{-3}$ | 3.9 | $1.4 \times 10$ |

[Gamma dosage (in Roentgens per hour) [2]]

| Distance (Meters): | | | | | |
|---|---|---|---|---|---|
| 10 | $5.2 \times 10^6$ | $5.2 \times 10^6$ | $5.2 \times 10^6$ | $5.2 \times 10^6$ | $5.2 \times 10^6$ |
| 50 | $2.0 \times 10^5$ | $2.1 \times 10^5$ | $2.1 \times 10^5$ | $2.1 \times 10^5$ | $2.1 \times 10^5$ |
| 100 | $4.8 \times 10^4$ | $5.1 \times 10^4$ | $5.2 \times 10^4$ | $5.2 \times 10^4$ | $5.2 \times 10^4$ |
| 200 | $1.0 \times 10^4$ | $1.2 \times 10^4$ | $1.3 \times 10^4$ | $1.3 \times 10^4$ | $1.3 \times 10^4$ |
| 500 | $7.5 \times 10^2$ | $1.5 \times 10^3$ | $1.9 \times 10^3$ | $2.0 \times 10^3$ | $2.1 \times 10^3$ |
| 1000 | $4.8 \times 10$ | $1.9 \times 10^2$ | $3.8 \times 10^2$ | $4.8 \times 10^2$ | $5.2 \times 10^2$ |
| 2000 | $4.7 \times 10^{-1}$ | $1.2 \times 10$ | $4.6 \times 10$ | $1.0 \times 10^2$ | $1.3 \times 10^2$ |
| 5000 | $1.3 \times 10^{-6}$ | $1.1 \times 10^{-2}$ | $7.8 \times 10^{-1}$ | 7.5 | $2.1 \times 10$ |
| 10,000 | | $3.0 \times 10^{-7}$ | $2.7 \times 10^{-3}$ | $4.8 \times 10^{-1}$ | 5.2 |

[1] Flux of fast neutrons has been given in terms of Roentgens per hour as a measure of effective biological damage potential on the conventional basis that 200 neutrons/cm.²/sec. gives 0.1 Roentgen per 8 hrs.
[2] Average gamma ray energy approximately 3.5 MEV.
In the following Table II currently accepted tolerance values for fast neutrons and gammas are set forth:

TABLE II

*Accepted radiation tolerance values*

[In Roentgens per hour]

| | Fast neutons | Gamma rays |
|---|---|---|
| Human beings | | (1 R/hr. total) |
| Radio and control instruments | $2 \times 10^6$ R/hr. | $1 \times 10^5$ R/hr. |

From the distance and air shielding attenuation data in Table I, the effectiveness in radiation flux reduction of various distances between the tug and tow craft may be readily calculated for virtually any suitable nuclear reaction employed in the tug. From this, combinations of distance and amount of conventional massive shielding at the rear of the reactor suitable for reducing the radiation flux to the tolerance values set forth in Table II may be estimated. In making such calculations, the above data should be applied on the basis that the spherical geometry consideration alone causes flux to be reduced proportionately with the square of the distance from the source (cf. the infinite altitude column in Table I), and the additional radiation attenuation effected by the bulk of intervening air is impressed thereupon. Furthermore, with regard to the effectiveness of massive shielding provided at the rear of the reactor, the reduction in radiation level characteristically proportionately varies logarithmically with the thickness of shielding. It may be generally observed from the foregoing, that, as would be intuitively expected, any massive shielding required in a specific tug-tow installation in accordance with this invention will necessarily be of much smaller weight and volume than that which would be required if the crew, instruments, and cargo were to be safely accommodated in the nuclear-powered airplane itself.

The illustrated embodiment is susceptible to various modifications within the scope of this invention. The tow airplane may be provided with a short-range, chemical-reaction propulsion engine to permit self-propulsion when detached from the tug. While, with such an arrangement, the tow plane would still normally be towed in unpowered flight, its independent propulsion would facilitate take-off and landing operations, and would, of course, be of advantage in the event of detachment from or failure or destruction of the tug. Further, the nuclear powered tug may alternatively be propelled by a plurality of jet engines deriving power from a single nuclear reaction, most conveniently by employing a circulating intermediate heat transfer medium, for example, liquid sodium. Also, if the cargo is sufficiently insensitive to radiation, it may be carried in the tug, advantageously permitting a very small tow craft of minimal aerodynamic drag to be utilized to accommodate the crew.

An important aspect of the present invention is the extension of the described basic aircraft combination to include the towing of a plurality of aircraft by a single, remotely-controlled nuclear-powered tug airplane. Remote control of the tug may be had either by a particular towed aircraft, or selectively among a plurality of the towed aircraft. In commercial use, for example, the manned towed craft may be airplanes carrying freight or passengers bound for different destinations along the route. In operation, as the destination of a particular towed aircraft is approached, that aircraft detaches itself from the tug and glides or is flown by self-contained auxiliary chemical propulsion means to its destination. Other tow craft, with auxiliary self-propulsion means, take-off from intermediate points of embarkation along the route, intercept the tug in mid-air, and couple themselves to trailing tow cables by conventional aircraft-to-aircraft mid-air coupling means. In this manner the present invention provides long-range, high-speed commercial air transportation of great versatility.

In the military application of the aspect of plurality of towed aircraft, the aircraft combination comprises, for example, a completely self-contained high-speed bombing unit of uncommonly long range. For this purpose, the manned towed aircraft includes a bomber and a plurality of protective fighter airplanes. The fighter airplanes, provided with short-range, high-speed chemical-reaction propulsion means, detach themselves from the tug near the target to engage in independent protective action. The bomber is either towed over the target by the tug, or alternatively detaches from the tug under its own short-range, high-speed chemical power to effect its mission, leaving the tug controlled by another towed aircraft. Upon completion of the mission, the tow airplanes return and recouple to the tug, and proceed under the tug's power to their ultimate destination. Thus, the subject aspect of this invention provides improvements in both commercial and military aviation of enhanced range and speed. Other specific applications of this aspect will become apparent to those skilled in the art.

To further illustrate a particular specific embodiment of the present invention, a set of parameters for the design and operation of an aircraft combination similar to that diagrammatically shown in the appended drawing is set forth below.

Operational altitude: 40,000 ft.
Cruising speed at 40,000 ft.: Mach numbers 0.9 to 1.0
Tug airplane:
    Gross weight: 100,000 lbs.
    Lift to drag ratio: 15
    Length: 75'
    Span: 75'
    Propulsion:
        Nuclear reactor—
            Type: Self-sustaining chain $U^{235}$ fission reactor.
            Volume: 15 cubic ft.
            Weight of reactor core: 1700 lbs.
            Moderant: Graphite
            Contained fuel: 100 lb. $U^{235}$
            Number of parallel tubular air passages: 2500
            Ratio of cross sectional area of tube openings to total transverse area: 0.153
            Enveloping reflector: 0.5 ft. beryllium
            Shielding at rear—
                Material: ¼" x ¾" steel punchings in structural concrete matrix (2 lb. steel per 1 lb. Portland cement)
                Density: 256 lb./cu. ft.
                Thickness: 2 ft.
        Jet engine—
            Type: Turbo jet (air heated by direct passage through reactor)
            Maximum propulsive power: 125,000 H.P. (93,200 kw.)
            Air flow rate: 275 lbs./sec.
            Compressor pressure ratio: 35:1
            Turbine inlet temp.: 1800° F.
Tow airplane:
    Gross weight: 30,000 lbs.
    Payload crew and cargo: 13,000 lbs.
    Lift to drag ratio: 10
    Length: 45'
    Span: 45'
Tow cable:
    Type: Aircraft type preformed steel cable
    Size: 1 x 19—⅜" diameter
    Length: 5,000 ft.
Electrical cable:
    Construction: Multiplicity of insulated 18 gage copper wire conductors twined around the periphery of the tow cable, and the resulting cable cotton wrapped, then metal sheathed.

It is to be understood that all matter contained in the foregoing description is illustrative only and does not limit the scope of this invention, as it is intended to claim the invention as broadly as possible in view of the prior art.

What is claimed is:

1. An improved operationally-integrated aircraft combination comprising a tug airplane powered by a radiation-emitting power source, a tow aircraft adapted to carry a crew, coupling means between said tug airplane and said tow aircraft to permit unpowered flight of said tow aircraft when in towed relationship to said tug airplane, and control means operable from said tow aircraft adapted to control powered flight of said tug airplane.

2. In manned aircraft propelled by power derived from a contained harmful-radiation-emitting energy source, an operationally-integrated aircraft combination adapted for improved long-distance flight comprising a tug airplane powered by a radiation-emitting nuclear reactor, a tow aircraft adapted to carry crew and cargo, coupling means between said tug airplane and said tow aircraft to permit unpowered flight of said tow aircraft when in towed relationship to said tug airplane, and control means operable from said tow aircraft adapted to control powered flight of said tug airplane and to control the flight maneuvers of said tow aircraft during towed flight.

3. An improved operationally-integrated aircraft combination adapted for long-distance flight comprising a tug airplane powered by a radiation-emitting nuclear reactor, at least one tow aircraft, coupling means between said tug airplane and said tow aircraft to permit unpowered flight of said tow aircraft when in towed relationship to said tug airplane, control means operable from at least one of said tow aircraft adapted to control powered flight of said tug airplane, with each of said tow aircraft adapted to carry a crew and provided with means for controlling the flight maneuvers thereof during towed flight, and with at least one of said tow aircraft being provided with auxiliary self-propulsion means.

4. An improved operationally-integrated aircraft combination adapted for long-distance flight comprising a tug airplane powered by jet propulsion means deriving thermal energy for propulsion from a radiation-emitting, self-sustaining nuclear fission reactor contained in said tug airplane, a tow aircraft adapted to carry a crew, coupling means between said tug airplane and said tow aircraft to permit unpowered flight of said tow aircraft when in towed relationship to said tug airplane, and control means operable from said tow aircraft adapted to control powered flight of said tug airplane and to control the flight maneuvers of said tow aircraft during towed flight.

5. An improved operationally-integrated aircraft combination adapted for long-distance flight comprising a tug airplane powered by a radiation-emitting nuclear reactor, a plurality of tow aircraft each adapted to carry a crew, means for detachably coupling said tow aircraft to said tug airplane to permit unpowered flight of said tow aircraft when in towed relationship to said tug airplane, control means operable from at least one of said tow aircraft adapted to control powered flight of said tug airplane, control means in each tow aircraft for controlling its own flight maneuvers, auxiliary self-propulsion means provided in at least one said tow aircraft, and means for mid-air uncoupling and recoupling, to the tug airplane, of tow aircraft having said auxiliary self-propulsion means thus permitting separated, independent, self-propelled flight of such tow aircraft during a fraction of the duration of flight of said combination.

References Cited by the Examiner

UNITED STATES PATENTS

| | | | |
|---|---|---|---|
| 1,683,000 | 9/28 | Trauger | 180—77 |
| 1,849,562 | 3/32 | Williams | 180—77 |
| 2,058,523 | 10/36 | Stearns | 105—61 |
| 2,400,400 | 5/46 | Duer | 244—3 |
| 2,427,979 | 9/47 | Sorensen | 244—3 |

OTHER REFERENCES

Goodman: The Science and Engineering of Nuclear Power, vol. 1, page 275, Addison-Wesley (1947); vol. 2, pages 177–195 and 277–281, Addison-Wesley (1949).

Smyth Report, Atomic Energy for Military Purposes, August 1945.

Smith et al.: "Applied Atomic Power," pages 137–140, 160–172, Prentice-Hall, Inc. (1946).

MILTON BUCHLER, *Primary Examiner.*

SAMUEL BOYD, JAMES L. BREWINK, MALTON V. EVANS, *Examiners.*